United States Patent Office 3,511,819
Patented May 12, 1970

3,511,819
THERMALLY DURABLE AROMATIC COPOLYAMIDES
James L. Bleasdale, Waynesboro, Va., assignor to E. I. du Pont de Nemours and Company, Wilmington, Del., a corporation of Delaware
No Drawing. Filed Mar. 1, 1967, Ser. No. 619,617
Int. Cl. C08g 20/20
U.S. Cl. 260—78         1 Claim

ABSTRACT OF THE DISCLOSURE

A copolymeric composition particularly useful for fiber preparation typified by the copolyamide formed from m-phenylenediamine with a mixture of isophthalic and terephthalic acids, the acids being in an Ip/Tp molar ratio of from 45/55 to 5/95. A higher ratio results in a substantial loss of high temperature and hydrolytic stability properties of fibers formed from the composition, while a lower ratio produces a composition of low solubility in conventional solvents useful for fiber preparation.

CROSS-REFERENCE TO RELATED APPLICATIONS

Copolymers of m-phenylenediamine with a mixture of isophthalic and terephthalic acids (abbreviated hereinafter as MPD-IpTp) wherein the Ip/Tp molar ratio is within the limits of from 80/20 to 50/50 is described in copending U.S. application S.N. 543,078 filed Apr. 18, 1966, now U.S. Pat. 3,354,127, these copolymers being of particular value for lacquers in view of their relatively high solubility in conventional solvents and low crystallinity.

BACKGROUND OF THE INVENTION

Field of the invention

The invention relates to a composition of matter, more specifically, a copolyamide.

Description of the prior art

Aromatic polyamides derived from aromatic diamines and aromatic diacyl halides are well-known in the art, as exemplified by U.S. Pat. 3,094,511. A particularly useful species is the polymer produced from metaphenylene diamine and isophthalic acid (abbreviated herein as MPD-Ip) described and claimed in U.S. Pat. 3,287,324, copolymers in this patent are limited to those wherein the isophthalic acid component constitutes at least about 85% of the acid constituents.

STATEMENT OF THE INVENTION

In accordance with the present invention a copolymeric carbonamidic composition particularly useful for fiber preparation is provided consisting essentially of units of the formula

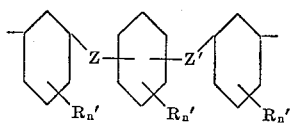

wherein —Y— is a mixture of

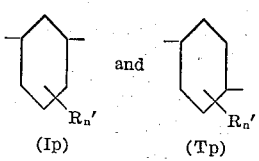

in an Ip/Tp molar ratio of from 45/55 to 5/95, and —Y'— is a member of the class consisting of

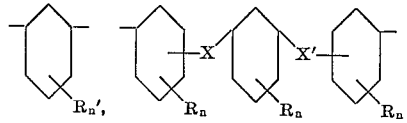

and

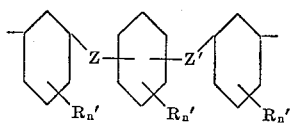

wherein the hexagons represent benzene nuclei, n is a positive integer of from 0 to 4 inclusive —R and —R' are substituents attached to nuclear carbon which are non-amide-forming at room temperature via reaction with a member from the class consisting of amino hydrogen and carbonyl halide, the chain-extending bonds are oriented meta or para, with the proviso that those of the terminal phenylenes are the same, —X—, and —X'—, respectively, are $$-\overset{O}{\underset{}{\overset{\|}{C}}}-\overset{H}{\underset{}{\overset{|}{N}}}-$$

and $$-\overset{H}{\underset{}{\overset{|}{N}}}-\overset{O}{\underset{}{\overset{\|}{C}}}-$$

and —Z— and —Z'—, respectively, are $$-\overset{H}{\underset{}{\overset{|}{N}}}-\overset{O}{\underset{}{\overset{\|}{C}}}-$$

and $$-\overset{O}{\underset{}{\overset{\|}{C}}}-\overset{H}{\underset{}{\overset{|}{N}}}-$$

Preferably n is a number from 0 to 2, inclusive, —R is a member of the class consisting of lower alkyl, lower alkoxy, halogen, sulfo and lower carbylkoxy, —R' is a member of the class consisting of —R, cyano and nitro, and the Ip/Tp molar ratio is from 40/60 to 10/90. It has been found that copolymeric compositions similar to those described in the present application but in which the "Tp" component comprises more than about 95% are too low in solubility to support commercial fiber spinning. At the other extreme, a copolymer in which the "Tp" component comprises less than 55% of the combined acid is unattractive for fibers due to a decreased rate of crystallization resulting in lower melting points, substantial loss in both high-temperature durability and hydrolytic stability and excessive fiber shrinkability at high temperature.

The high molecular weight copolymers of this invention are prepared by solvent polymerization by reacting the mixture of aromatic diacid chlorides with an appropriate aromatic diamine, the acid groups of the diacid chloride being mixed meta and para and the amine groups of the diamine being meta oriented relative to each other, at low temperature (below 100° C.). This process is described in detail in U.S. 3,063,966 to Kwolek, Morgan and Sorenson (Nov. 13, 1962).

DEFINITIONS AND STANDARDS

The following examples are cited to illustrate the invention. They are not intended to limit it in any manner. All parts and percentages are by weight unless otherwise indicated. Melting points are determined by differential thermal analysis using the method described in Newer Methods of Polymer Characterization (Chapter 9 of Polymer Reviews, vol. 6, Interscience, 1964, Bacon Ke, Editor). Inherent viscosities reported are measured at 25° C. in dimethylacetamide containing 4% by weight lithium chloride and 0.5% by weight polymer. A polymer having an inherent viscosity of 0.8 or above is fiber-forming. Thermal durability is determined by subjecting a skein of yarn to an oxygen atmosphere under 10 p.s.i.g. at 260° C. for 24 hours (except in Example 2 and Comparative Control (C) where the yarn is exposed for 6 hours to an air atmosphere at 300° C.). Hydrolytic durability is determined by subjecting a skein of yarn to 4 N aqueous sulfuric acid at 100° C. for six hours (except for Example 1 in which an exposure period of five hours is employed).

EXAMPLE 1

(Preparation of MPD-Ip/Tp, 20/80)

A solution of 255 parts metaphenylenediamine (MPD) in 2,540 parts dry N,N-dimethylacetamide (DMAc) is cooled to less than 0° C. While stirring rapidly under a blanket of nitrogen and with continuing external cooling by means of a Dry Ice-alcohol bath, 480 parts of a molten 20/80 mixture of isophthaloyl chloride (Ip) and terephthaloyl chloride (Tp) are slowly added. Cooling is terminated when about three-fourths of the acyl halides have been added. Stirring is continued during the addition of all the acyl halide and for an additional 60 minutes. During addition of 175 parts of dry lime, the temperature of the resulting neutralized solution rises to about 90° C. The reactor is evacuated for several hours which serves to remove entrained gases, part of the solvent, and a small amount of water. The final solution contains 14.3% of an MPD-Ip/Tp (20/80) copolymer, which has an inherent viscosity of 2.4.

Solutions from several such runs are accumulated. Filaments are dry-spun from this solution and wash-drawn in hot water to 220% of their as-spun length. After an additional drawing to 150% of the wash-drawn length by a pair of rolls heated to 350° C., the yarn is 117-denier, 50-filament and is found to have a tenacity of 4.3 g.p.d., an elongation-at-break of 19% and a work-to-break of 0.56 gm.-cm./den.

A sample of spun yarn prepared in a manner similar to the above is wash-drawn in hot water to 150% of its as-spun length. After drying it is drawn to 600% of its undrawn length over a hot roll heated to about 260° C. The 260-denier, 50-filament yarn has a tenacity of 3.6 g.p.d., elongation of 23% and work-to-break of 0.67 gm.-cm./den. Durability properties are reported in Table I.

EXAMPLE 2

(Preparation of MPD-Ip/Tp, 5/95)

The procedure of Example 1 is repeated except that 381.5 parts of a 5/95 mixture of Ip/Tp is substituted for the 20/80 mixture of that example, 200 parts of MPD is used and the solvent is 2350 parts of DMAc. After addition of 134 parts of dry lime and vacuum deaeration, there is obtained a 13.7% solution of a polymer having an inherent viscosity of 1.49. This solution is relatively stable as demonstrated by moderate viscosity increase on standing; the solution has a viscosity of 1625 poises after one day, 1870 poises after two days and 1820 poises after three days, all measured at 25° C. Fibers are obtained by dry-spinning the 1820 poise solution and they are wash-drawn in hot water to 266% of their as-spun length. The resulting 68-denier, 18-filament yarn has 5.78 g.p.d. tenacity, 12% elongation, and 0.49 gm.-cm./den. work-to-break, and is found to shrink 0.62% on exposure to a dry atmosphere at 285° C. for 2 minutes. Durability properties are reported in Table I.

EXAMPLE 3

(Preparation of MPD-Ip/Tp, 35/65)

The preparative procedure of the preceding examples is substantially repeated except that a 35/65 mixture of Ip/Tp is used. The resulting copolymer has an inherent viscosity of 1.7, and a melting point of 450° C. Solutions are accumulated from several such preparations and dry-spun to a 50-filament yarn. After wash-drawing in hot water to 330% of its as-spun length, it has a denier of 107. It has a shrinkage of 0.94% at 285° C. dry, a tenacity of 3.83 g.p.d., an elongation of 30%, and a work-to-break of 0.90 gm.-cm./den. Table I reports stability properties of this yarn.

COMPARATIVE CONTROL (A)

(Preparation of MPD-Ip/Tp, 100/0)

A skein of 175-denier, 100-filament yarn prepared following the technique of Example 1 from poly(metaphenylene isophthalamide), MPD-Ip, of 1.5 inherent viscosity and a melting point of 412° C., which has been wash-drawn in hot water to 530% of its as-spun length and dried.

COMPARTIVE CONTROL (B)

(Preparation of MPD-Ip/Tp, 0/100)

Using the procedure of Example 1, 100 parts of MPD are reacted with 190 parts of terephthaloyl chloride in 2360 parts of solvent. After addition of lime and vacuum deaeration, a 9.9% solution of polymer is obtained. However, this solution is unstable as evidenced by its viscosity increase on storage. As prepared, the solution has a viscosity of 110 poises; after two days, the viscosity has risen to 350, and after five days, to 1120 poises. It is also observed that the solution is hazy with precipitated polymer. Such instability leads to difficulties in spinning. Furthermore, spinning from a solution having a solids content of 10% or less is uneconomical and very difficult on a commercial scale. When an attempt is made to increase the solids content by doubling the concentration of reactants, crystalline polymer precipitates.

After filtration of the 9.9% solution to remove precipitated polymer, the solution is dry-spun before allowing the viscosity to increase excessively. After wash-drawing in hot water to 200% of its as-spun length and drawing to 133% of its first-drawn length onto a roll heated to 300° C., its tenacity, elongation and work-to-break are 6.7 g.p.d., 14.5% and 0.61 gm.-cm./den., respectively. A sample of washed and dried polymer has a melting point of 510° C.

COMPARATIVE CONTROL (C)

(Preparation of MPD-Ip/Tp, 50/50)

Following the procedure of Example 1, a 50/50 copolymer is prepared in 1950 parts of DMAc from 200 parts MPD and 378.7 parts of a 50/50 mixture of Ip and Tp. After neutralization with 135 parts of lime, the solution is deaerated and found to contain 18% of a polymer of 2.12 inherent viscosity. The solution has a viscosity of 7000 poises at 50° C. Several such solutions are combined and spun into fibers. A part of the spun yarn is wash-drawn in hot water to 400% of its as-spun length to yarn having a denier of 165 (50 filaments). Initial properties are 3.7 g.p.d. tenacity, 35% elongation, 0.87 gm.-cm./den. work-to-break and 5.97% shrinkage when subjected to a temperature of 285° C. for 2 minutes. The excessive shrinkage on testing for thermal durability results in an increase of 27% of the original elongation value making the result appear much higher than is realistic. The fiber has a melting point of about 300° C.

A second portion of the spun yarn is wash-drawn in hot water to 200% of its length. After drying it is drawn to 250% on a roll heated to 300° C., resulting in 500% over-all draw. This yarn shows 3.00 g.p.d. tenacity, 17.8% elongation and 0.41 gm.-cm./den. work-to-break. An attempt is made to measure thermal durability, but the high shrinkage of this yarn at 285° C. (28%) makes meaningful measurement impossible.

COMPARATIVE CONTROL (D)

(Preparation of MPD-Ip/Tp, 70/30)

A 70/30 MPD-Ip/Tp copolymer is prepared according to the general procedure of Example 1 from 20 parts MPD and 0.9 parts aniline in 2080 parts DMAc and 380 parts of a molten solution of 70% Ip and 30% Tp. Neutralizing action is effected by addition of 142 parts dry lime. After deaeration, a solution containing 18.5% polymer of 1.51 inherent viscosity is obtained. A sample of polymer of this type is found to have a melting point of 300° C. Additional runs are made as above and the combined solutions are spun to a 180-denier, 18-filament yarn which is wash-drawn in hot water to 300% of its as-spun length and dried at 100° C. The final yarn denier is about 55. It has a tenacity of 1.0 g.p.d., an elongation of 20%, a work-to-break of 0.19 gm.-cm./den. and shrinks 9% on exposure to 285° C. for 2 minutes.

Table I below shows thermal and hydrolytic durability values obtained upon yarns of the above preparations. In the table "95" represents the "5/95" preparation, "80" the 20/80, etc.

TABLE 1

| | "Tp" component of Ip/Tp ratio | | | | | | |
|---|---|---|---|---|---|---|---|
| | 95 | 80 | 65 | 50 | 30 | 0 | 100 |
| Thermal: * | | | | | | | |
| T | 64 | 87 | 76 | 35 | 56 | 49 | 62 |
| E | 103 | 90 | 90 | 127 | 30 | 72 | 88 |
| W/B | 77 | 72 | 73 | 55 | 14 | 47 | 71 |
| Hydrolytic: * | | | | | | | |
| T | | 65 | 79 | | | 57 | |
| E | | 105 | 91 | | | 52 | |
| W/B | | 70 | 71 | | | 32 | |

* Figures represent percent of property retained.
T=Tenacity (g.p.d.); E=Elongation (percent); W/B=Work-to-break (percent).

As can be seen from the Table, a low "Tp" value in the Ip/Tp ratio, results in substantially poorer results in thermal and hydrolytic stability. It is also results in very high shrinkages (Comparative Control C). On the other hand, at the maximum "Tp" value, difficulties in preparing a solution of adequate concentration and stability are experienced as can be seen from Comparative Control (B).

EXAMPLE 4

(Paper from MPD-Ip/Tp, 15/85)

A solution of 225 parts of MPD and 2.5 parts aniline in 2720 parts DMAc is cooled in a bath of Dry Ice and alcohol. While rapidly agitating this solution, 433 parts of a molten mixture of 15% Ip and 85% Tp are slowly added. The solution is stirred for a total of 60 minutes then neutralized with 154 parts lime as in the previous examples to yield a 14.4% solution of a polymer having an inherent viscosity of 1.14.

Using procedure and apparatus such as taught in the Duggins U.S. Pat. 3,018,091, a quantity of solution prepared as described in this example is converted to fibrids. They are thoroughly washed in cold water and, without allowing the mass to dry, are dispersed in water to give a 0.1% stock which is used to prepare a hand sheet using techniques known to the paper art. After drying at 150° C. to constant weight and pressing between plates at first 255° C. and 1000 p.s.i.g. for one minute, then at 295° C. and 1000 p.s.i. for one minute, the paper is found to be adequately strong for a wide variety of uses and to shrink only 0.35% when heated to 285° C. for 60 minutes.

By way of comparison, a 100%-fibrid paper prepared from MPD-Ip polymer fibrids has a level of shrinkage too high (20%) for most uses and must be modified by incorporating at least about 5% flock (short, about ¼" long fibers which may typically be of the same composition) based on the total composition, to reduce the shrinkage to an acceptable level.

EXAMPLE 5

(Preparation of substituted MPD-Ip/Tp, 15/85)

A solution is prepared to contain 203 parts MPD and 25 parts of the sodium salt of sulfo-MPD in 2160 parts of DMAc. It is cooled in a bath of Dry-Ice and alcohol. While stirring rapidly, 413 parts of a molten mixture of 15% Ip and 85% Tp are slowly added. Stirring is continued for a total of 60 minutes. The mixture is then neutralized with 148 parts lime to give a solution of 16% solids and 1.56 inherent viscosity. The resulting solution is deaerated as in the previous examples. It is suitable for spinning of fibers which, when simultaneously washed free of solvent and salt and drawn from 260 to 300% of their as-spun length, have physical properties substantially equivalent to those without the sulfo-MPD and which exhibit a useful degree of dye receptivity when dyed with commercially available basic dyes for three hours under a pressure of 15 p.s.i.g. and in the presence of 10 gms./l. of a carrier comprising equal parts of dimethyl terephthalate and benzanilide.

The preparation of this example is repeated in separate preparations substituting 2,4-diamino chlorobenzene, 2,4-diamino toluene and 2,4-diamino anisole for the sulfo-MPD above. A fiber-forming polymer of useful properties is obtained in each instance. Similarly, a fiber-forming polymer is prepared following the above technique but using 5-methyl-isophthaloyl chloride as the "Ip" component and 5-methyl-terephthaloyl chloride as the "Tp" component.

EXAMPLE 6

(Preparation of multi-ring-diamine-Ip/Ip, 15/85)

N,N' - metaphenylenebis(metaaminobenzamide) (200 parts) are dissolved in 1600 parts of dimethylacetamide in a resin pot. The mixture is cooled to less than 0° C. and a molten mixture of 15% isophthaloyl chloride, 85% terephthaloyl chloride is slowly added until about 100 parts are used. At this time external cooling is discontinued and polymerization continued to stoichiometry. A total of 122 parts of the Ip/Tp mixture is used. The liberated HCl is neutralized with 43 parts of dry lime. The finished polymer solution is deaerated to remove entrained gases. Several such solutions are blended, filtered and dry-spun into filaments which are wash-drawn in hot water to 220% of their as-spun length, followed by drying at 120° C. over a rotating roll and then drawn to 150% of their new length over a roll heated to about 320° C. These yarns exhibit good physical properties and a crystal melting point of above 450° C. Thermal and hydrolytic durabilities are about equivalent to those of the product described in Example 1.

POLYMER AND FIBER PROPERTIES

Polymers of this invention are characterized by an exceptionally high melting point. Whereas aliphatic polyamides melt at temperatures below about 270° C., and tractable aromatic polyamides known to the art generally melt at 300°–400° C., the polyamides of this invention have melting points in excess of 400° C. and in many instances above 450° C. Moreover, filaments of polyamides of this invention retain their filament form at temperatures above 400° C. Polymers of this invention are also distinguished from known polyamides in having water-white color, excellent resistance to corrosive atmospheres, substantially no flammability, and outstanding resistance to degradation by high energy particle and gamma ray radiation. Fibers from these polymers resist melting upon exposure to 300° C. for extended periods while retaining hitherto unrealized high proportion of room temperature physical properties. Flash exposure for 20 seconds to temperatures as high as 700° C. does not destroy these fiber properties. Because of their solubility, these polymers may be processed into shaped structures such as films and filaments by conventional techniques. These polymers have high tenacity, good work recovery, high flex life at elevated temperatures. They are readily crystallizable.

What is claimed is:
1. A fiber-forming copolymeric carbonamidic composition consisting essentially of units of the formula
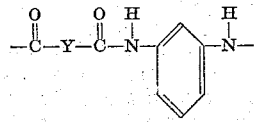
wherein Y is a mixture of
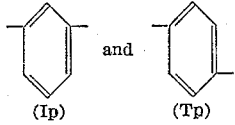
in an Ip/Tp molar ratio of from 45/55 to 5/95.
References Cited
UNITED STATES PATENTS
| | | | |
|---|---|---|---|
| 3,094,511 | 6/1963 | Hill et al. | 260—78 |
| 3,145,193 | 8/1964 | Gabler | 260—78 |
| 3,184,436 | 5/1965 | Magat | 260—78 |
| 3,194,794 | 7/1965 | Caldwell et al. | 260—78 |
| 3,296,204 | 1/1967 | Caldwell | 260—78 |
| 3,349,062 | 10/1967 | Hill et al. | 260—78 |
| 3,354,127 | 11/1967 | Hill et al. | 260—78 |
HAROLD D. ANDERSON, Primary Examiner
U.S. Cl. X.R.
162—157; 260—47, 32.6